July 25, 1961
W. H. MOORHEAD, JR
DEVICE FOR IDENTIFYING THE ELECTRICAL
CIRCUITS FOR TRAILER-TYPE VEHICLES
Filed Dec. 17, 1959
2,994,001
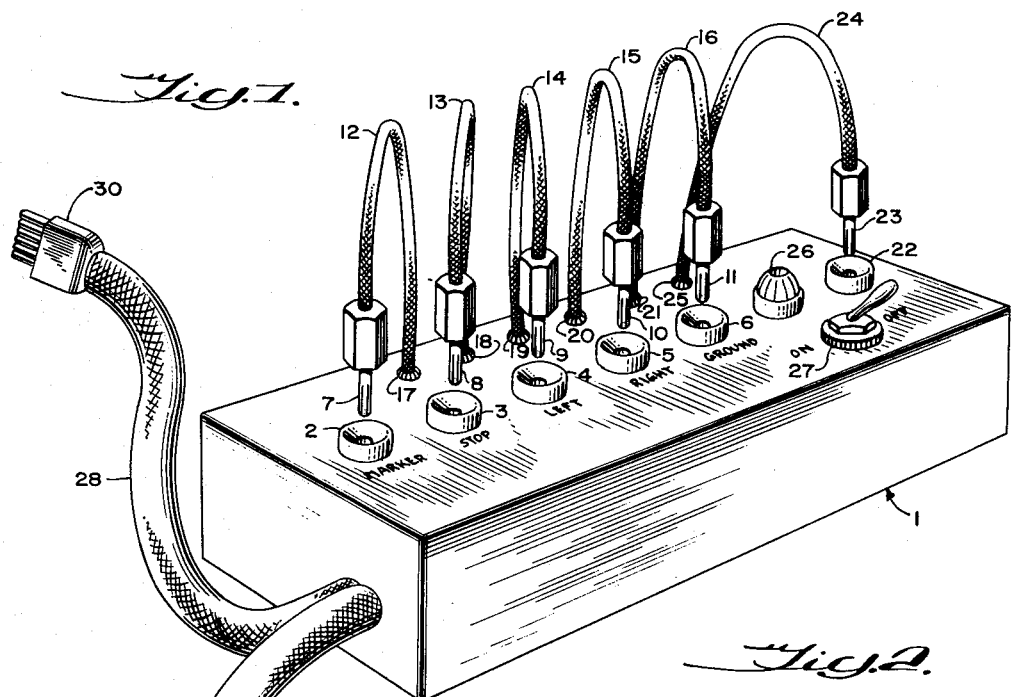
INVENTOR
WILLIAM H. MOORHEAD, JR.
BY Thomas & Crickenberger
ATTORNEYS United States Patent Office 2,994,001
Patented July 25, 1961

2,994,001
DEVICE FOR IDENTIFYING THE ELECTRICAL CIRCUITS FOR TRAILER-TYPE VEHICLES
William H. Moorhead, Jr., Box 2713, Cloverland Station, Montgomery 5, Ala.
Filed Dec. 17, 1959, Ser. No. 860,188
1 Claim. (Cl. 307—10)

This invention relates to a device for identifying the electrical circuits in trailer-type vehicles.

In the transportation field where the tractor-trailer types of truck vehicles are utilized, it is customary for the tractor (engine driven cab vehicle) to be employed for pulling a number of different types of trailer vehicles in the normal course of operations. The electrical circuits for the trailer vehicles are energized from the tractor, and in addition to mechanically connecting the trailer to the tractor, certain electrical connections, such as the lighting circuits, must also be established. Since the plugs for connecting the tractors and trailers are not always uniform in following a particular conductor arrangement pattern, the occasion frequently arises in which the electrical circuits will be improperly matched upon merely joining together the plug connectors. When these occasions arise, it then becomes necessary to remove each wire from the connector plug and rearrange the wires by a trial and error process. It will be appreciated that the process of removing these wires from the plug and rearranging them requires a considerable amount of time, and that the services of a trained mechanic are generally needed.

The present invention overcomes the difficulties mentioned above by providing a device by means of which the circuits in various trailer vehicles are readily identifiable, and which may be operated by persons other than trained mechanics. One arrangement of the invention utilizes an enclosure, of no particular dimensions, mounted on the tractor, and to which the electrical circuits from the tractor and the trailer are connected. The enclosure has a set of connector elements to which the electrical circuits from the tractor are connected, and a complementary set of movable connector elements to which the electrical conductors from the trailer vehicle are connected. An additional connector element is provided on the enclosure and is connected through a switch to a source of electrical potential. A visual indicator, such as a pilot light, is associated with this additional connector to indicate when the circuit is energized. A circuit interrupter device is connected in series betwen the source of electrical potential and the additional connector element to protect the circuits in the case of an overload caused by a short circuit. The connector elements associated with the tractor are properly labeled, and by individually inserting the connector elements associated with the trailer vehicle in the additional connector element provided, the conductors from the trailer vehicle can be identified and the connector elements properly matched.

This arrangement of the invention is illustrated in the accompanying drawings in which:

FIG. 1 is a perspective view of a device constructed in accordance with the invention; and FIG. 2 is a diagrammatic wiring view showing the electrical circuitry employed.

Referring now to FIG. 1 of the drawings, the device is shown to include an enclosure, generally indicated by the numeral 1, which may be a small metal box or other structure suitable for this use. Mounted on the enclosure 1 is a plurality of connector elements 2 to 6. Movably mounted on the enclosure 1 is a second plurality of connector elements 7 to 11, having associated therewith leads 12 to 16 which pass through holes through the enclosure 1 and are secured by any suitable means such as grommets 17 to 21. The two groups of connector elements may be of any suitable configuration such as conventional banana plugs, the only requirement for these and the remaining circuit components being that they be capable of carrying sufficient current. A 20-ampere current load capacity has been found to be suitable for the purposes set forth.

Additional mating connector elements 22 and 23 are provided near one end of the box. Connector 23 is joined to lead 24 which passes through the enclosure 1 and is held by grommet 25. A pilot light assembly 26, and a single pole-single throw switch 27 are also mounted on the enclosure 1.

A pair of cables 28 and 29 are shown to protrude from the end of enclosure 1. Cable 28, which contains conductors 12 to 16 and 24, has a plug 30 for connection with the cable lead from the trailer vehicle. Cable 29, which contains conductors 31 to 36, is permanently wired to the circuits in the tractor vehicle. It will be understood, of course, that plug 30 could be mounted on enclosure 1 instead of extending at the end of cable 28 as shown, and that the cable 29 could similarly be replaced by a plug mounted on enclosure 1 in such fashion that the device could be completely disconnected and rendered portable.

FIG. 2 of the drawings shows the manner in which these components are wired. A circuit breaker 37 is connected in series between the switch 27 and a source of potential 38. This circuit breaker may be of 20-ampere capacity and have self-reset type characteristics.

In operation, the plug 30 is connected to the plug from the trailer vehicle (not shown) and all of the connector elements 7 to 11 and 23 are removed from the connector elements 2 to 6 and 22. The connector element 22 serves as the search or test element. Each of the connectors 7 to 11 and 23 is inserted in connector element 22, and the switch 27 is moved to the on position. The operator may then observe the lighting circuits of the trailer vehicle to see which set of lights has been actuated. When the lighting circuit has thus been identified, the connector element under test is removed from connector 22 and inserted in its properly identified counterpart connector. The permanently mounted connector elements in FIG. 1 of the drawings are shown as being labeled "marker," "stop," "left," "right" and "ground." It is to be understood, of course, that other markings may be employed where applicable. The circuit breaker 37 will be necessary to protect the wiring when the ground lead is identified, as well as to indicate any other short circuits which may be present. The test connector 22 may also serve as an accessory connection to the trailer vehicle under the control of switch 27.

By using the device of the present invention, every circuit is checked before being connected to the tractor system. This virtually eliminates all possibilities of blown fuses and erroneous connections. The device simplifies the wiring of these separable vehicles to the point where any tractor-trailer can be properly lighted without the assistance of a trained mechanic. This is advantageous in eliminating the tendency of drivers to go on the road when improperly lighted and create safety hazards. Since it is no longer necessary to re-wire the connector plugs, the possibility of sloppy wiring is eliminated with the consequent danger of short circuits causing light failure or fire. The advantage of savings in time and money by not delaying equipment and freight at the terminal are obvious.

While the invention has been illustrated and described in one arrangement, it is recognized that variations and changes may be made therein without departing from the invention as set forth in the claim.

What is claimed is:

In an engine driven tractor cab having a plurality of controlled electrical circuits the combination comprising a device for identifying corresponding electric conductors to be attached thereto from a separable trailer vehicle, said device comprising an enclosure, a plurality of individual female electrical connector elements mounted on said enclosure, a plurality of individual male electrical connector elements movably mounted on said enclosure, said female and said male connector elements being of complementary physical configuration to enable electrical connection therebetween, means connecting said plurality of female connector elements to the individual controlled electrical circuits on the tractor cab, means for connecting said plurality of male connector elements to the corresponding electric conductors from the separable trailer vehicle, an additional female connector element of a form complementary to that of said male connector elements, a switch, a circuit breaker, means connecting said additional female connector element in series with said switch and said circuit breaker to a source of electrical potential whereby the male connector elements may be individually inserted in the additional female connector element to determine the electric conductors with which they are associated prior to connection with said plurality of female connector elements, and a light connected in parallel with said switch, said circuit breaker and said source of electrical potential whereby said light is operated by said switch to indicate visually when the circuit is energized, when a short circuit exists in an electrical circuit on said trailer vehicle and when a ground lead is connected to said additional female connector element.

References Cited in the file of this patent

UNITED STATES PATENTS

| | | |
|---|---|---|
| Re. 24,259 | Hunt | Dec. 25, 1956 |
| 2,693,539 | Madigan | Nov. 2, 1954 |